United States Patent
Niu et al.

(10) Patent No.: US 7,436,781 B2
(45) Date of Patent: Oct. 14, 2008

(54) METHOD AND APPARATUS FOR DETERMINING THE LOCATION OF A NODE IN A WIRELESS SYSTEM

(75) Inventors: Feng Niu, Weston, FL (US); Jian Huang, Coral Springs, FL (US); Spyros Kyperountas, Coral Springs, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 609 days.

(21) Appl. No.: 11/143,253

(22) Filed: Jun. 2, 2005

(65) Prior Publication Data
US 2006/0274676 A1 Dec. 7, 2006

(51) Int. Cl.
*G01R 31/08* (2006.01)
(52) U.S. Cl. ...................... 370/252; 370/338
(58) Field of Classification Search ............ 370/255, 370/328, 332, 338, 396, 400; 342/451, 458; 455/456.1, 456.5, 456.6, 513
See application file for complete search history.

(56) References Cited

U.S. PATENT DOCUMENTS

| | | | |
|---|---|---|---|
| 5,613,205 A | 3/1997 | Dufour | |
| 6,140,964 A | 10/2000 | Sugiura et al. | |
| 6,990,428 B1 * | 1/2006 | Kaiser et al. | 702/150 |
| 7,116,988 B2 * | 10/2006 | Dietrich et al. | 455/456.1 |
| 7,205,938 B2 * | 4/2007 | Davi et al. | 342/451 |
| 7,286,829 B2 * | 10/2007 | Byun et al. | 455/446 |
| 7,286,835 B1 * | 10/2007 | Dietrich et al. | 455/456.1 |
| 2004/0203841 A1 | 10/2004 | Bayder | |

OTHER PUBLICATIONS

Patwari, N.; O'Dea, R.J.; Yanwei Wang: 'Relative location in wireless networks,' IEEE VTC'01, pp. 1149-1153.
Ghassemzadeh, S.S.; Jana, R.; Rice, C.W.; Turin, W.; Tarokh, V.: 'A statistical path loss model for in-home UWB channels', Ultra Wideband Systems and Technologies, 2002. Digest of Papers. 2002 IEEE Conference on , May 21-23, 2002, pp. 59-64.

* cited by examiner

*Primary Examiner*—Duc C Ho

(57) ABSTRACT

A method and apparatus for determining the path loss model of an object within a wireless communication system is provided herein. During operation, a path loss model for a node is generated based on path loss values and corresponding numbers of neighbors of the said node. The path loss model is used to determine a relationship between path loss and distance. With this relationship established, distances to known-located nodes may be obtained by obtaining a path loss to the known-located node. From these distances, a node can then be located.

16 Claims, 3 Drawing Sheets

100

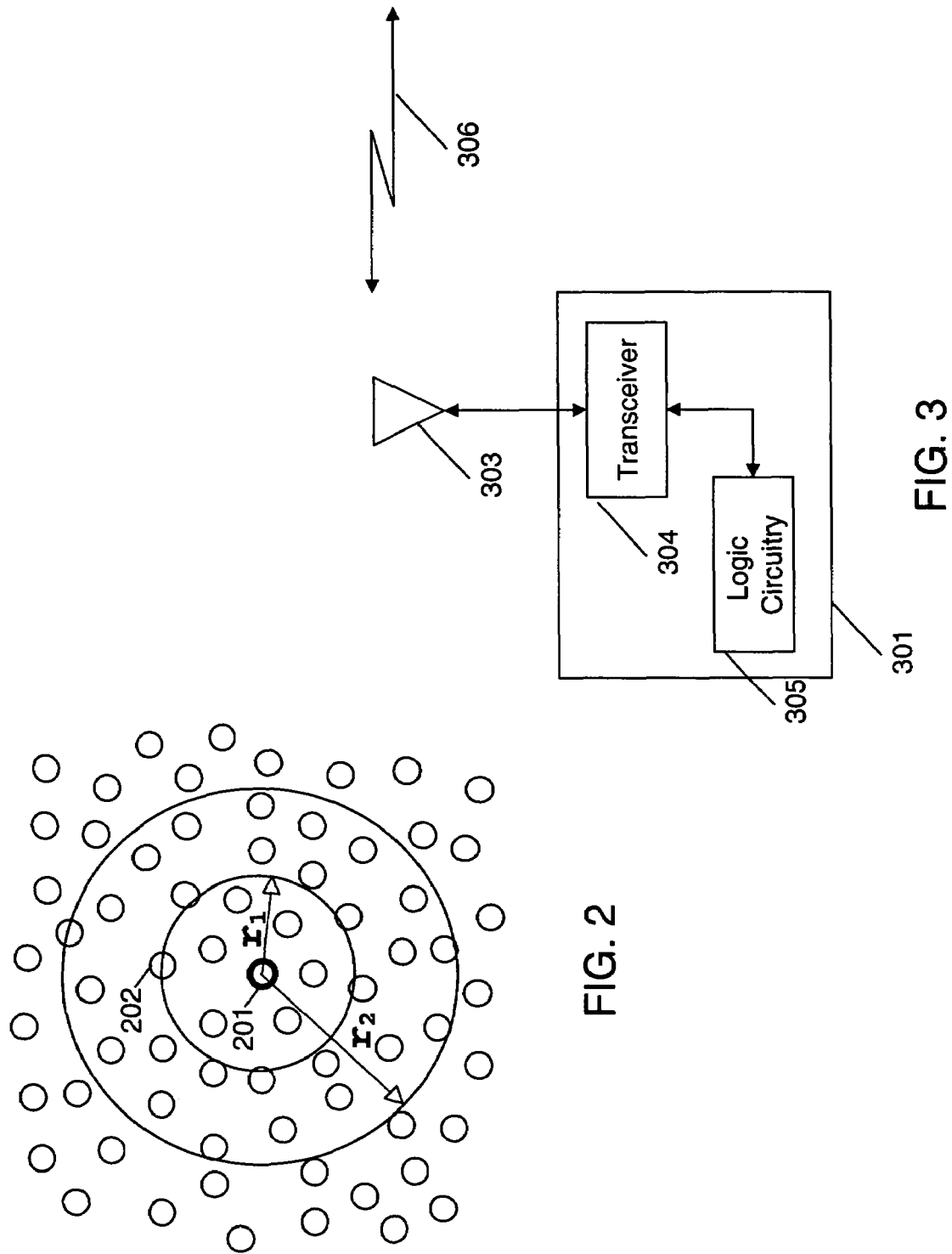

METHOD AND APPARATUS FOR DETERMINING THE LOCATION OF A NODE IN A WIRELESS SYSTEM

FIELD OF THE INVENTION

The present invention relates generally to radiolocation and in particular, to a method and apparatus for determining the location of a node within a wireless communication system.

BACKGROUND OF THE INVENTION

A variety of systems have been proposed that call for the ability to determine the location of an object within a wireless communication system. For example, in asset control, it is desirable to know the locations of objects (e.g., laptop computers, cell phones, . . . , etc.) within the confines of an office building. One technique utilized to locate objects is a power-based location technique. Such a technique relates the received signal strength (RSS) of a node to its distance. Although this technique can be very accurate in locating nodes within a communication system, power-based location techniques require a path loss model of the environment in order to perform inter-node range estimation. Thus, one has to carry out a measurement campaign to establish the relationship between the inter-node path loss and the inter-node distance, with path loss being a difference between a power a signal was received at and a power the signal was transmitted at. In the measurement campaign, the distances between many pairs of nodes have to be measured manually. When there are significant changes in the environment, the path loss model has to be re-established and thus measurement campaigns have to be carried out again. This makes any power-based location technique very cumbersome. Therefore, a need exists for a method and apparatus for locating a node within a wireless communication system that utilizes a power-based location technique, yet does not require the distances between pairs of nodes to be measured manually.

BRIEF DESCRIPTION OF THE DRAWINGS

FIG. 2 illustrates node density as it relates to a number of nodes within a particular radius.

FIG. 3 is a block diagram of a node equipped to determine a location.

DETAILED DESCRIPTION OF THE DRAWINGS

In order to address the above-mentioned need, a method and apparatus for determining the location of an object within a wireless communication system is provided herein. During operation, a path loss model for a node is generated based on path loss values and corresponding numbers of nodes on the neighbor list of the node. The path loss model is used to determine a relationship between path loss and distance. With this relationship established, distances to known-located nodes may be obtained by obtaining a path loss to the known-located node. From these distances, a node can then be located.

Because a path loss model is obtained based on a number of neighbors, there is no need to carry out a measurement campaign to establish the relationship between the inter-node path loss and the inter-node distance. Thus, there is no need to manually measure the distances between many pairs of nodes to establish a path loss model.

The present invention encompasses a method for locating a node within a wireless communication system. The method comprises the steps of determining a plurality of path loss values to a plurality of nodes, determining a path loss model based on a node density and the path loss to the plurality of nodes, and determining distances to known located nodes based on the path loss model. The node is then located based on distances to known located nodes.

The present invention additionally encompasses a method comprising the steps of determining a plurality of neighboring nodes, determining number of neighboring nodes having a path loss less than a particular neighboring node, determining a path loss model based on a node density and the number of nodes having the path loss less than the particular node, and determining distances to known-located nodes based on the path loss model. A location is then determined based on the distances to known-located nodes.

The present invention additionally encompasses an apparatus comprising a receiver receiving signals from a plurality of nodes, and logic circuitry analyzing the signals from the plurality of nodes to determine a number of nodes having a path loss less than a particular node, determine a path loss model based on a node density and a number of nodes having the path loss less than the particular node, determine distances to known-located nodes based on the path loss model, and determine a location based on the distances to known-located nodes.

Figure 1:
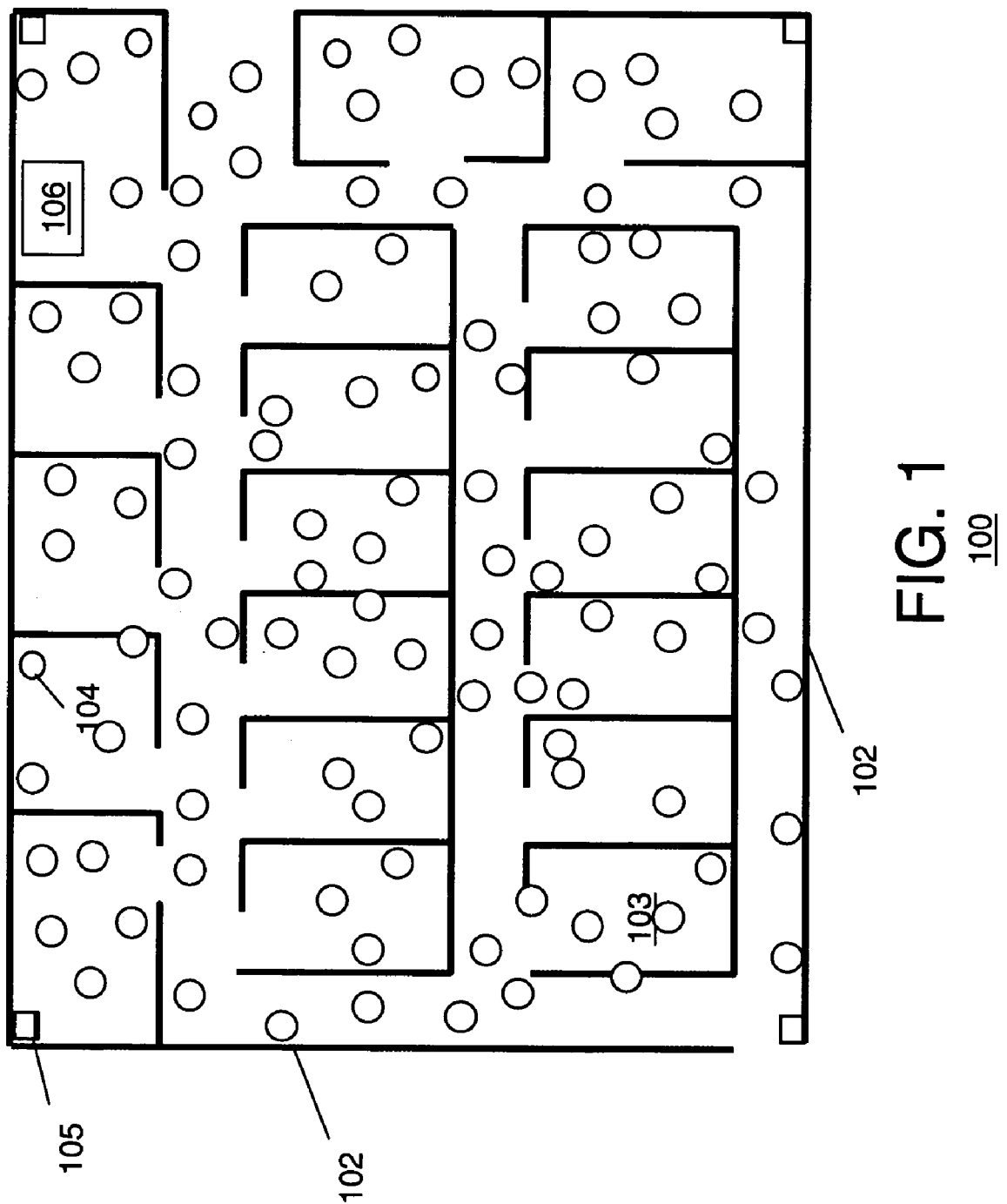
FIG. 1 illustrates a typical floor plan of an office building in which are located a number of wireless devices involved in determining each other's location.

Turning now to the drawings, wherein like numerals designate like components, FIG. 1 is a block diagram of communication system 100 deployed over a floor plan of an interior of an office building. Communication system 100 comprises a number of wireless devices 104 involved in determining a particular node's location. The office building comprises perimeter wall 102 that encloses a plurality of offices 103 (only one office labeled).

Circular objects, or nodes 104 (only one labeled) represent wireless devices, the locations of which are unknown and to be determined. Nodes 104 can include, for example, transceiver security tags attached to valuable assets such as lap top computers, laboratory equipment, or be embedded in wireless communication devices including cellular telephones. Rectangular objects 105 (only one labeled) represent reference nodes. The locations of nodes 105 are known, or can be easily and accurately determined to within some measurement accuracy (e.g., via physical measurement or via GPS).

It should be noted that although FIG. 1 shows nodes 104 existing within a two-dimensional space, one of ordinary skill in the art will recognize that nodes 104 may be located in other environments, including 3-dimensional spaces. For example, nodes 104 may comprise golf carts equipped with wireless transceivers located on a golf course. In a similar manner, nodes 104 may be attached to inventory located within a multi-level warehouse. Irrespective of the environment where nodes 104 operate, a power-based location technique is utilized where a path-loss model is estimated prior to location taking place. Location then takes place using the path-loss model and estimated distances to nodes having a known location. More particularly, once a path-loss model is known, any node can then relate a path loss to a node to the distance to the node. Path loss measurements (and hence distances) are determined from a node to known located nodes 105, and an estimated location for the node is determined based on the distances. Any location estimate may be made by simple multi-lateration techniques, or any multitude of techniques known in the art for determining a location estimate.

It should be noted that in the preferred embodiment of the present invention each node 104 is capable of determining its own location based on a path-loss model and path-loss measurements to known-located nodes 105, however in an alternate embodiment of the present invention, centralized location-finding equipment 106 is provided to calculate locations. In the alternate embodiment of the present invention, nodes 104 will provide distance estimates to equipment 106. Location-finding equipment 106 will then use the provided distances to calculate locations for nodes 104.

As discussed above, although power-based location techniques can be very accurate in locating nodes within a communication system, such techniques require a path loss model of the environment in order to perform inter-node range estimation. Thus, one has to carry out a measurement campaign to establish the relationship between the inter-node path loss and the inter-node distance. In the measurement campaign, the distances between many pairs of nodes have to be measured manually. In order to address this issue, a path-loss model for a node 104 is determined based on path loss values and the corresponding numbers of neighbors of node 104. The path-loss model determination done in this manner does not require inter-node distance measurement.

Path Loss Model Determination

Although many different equations relating path loss to distance may be used, for ease of explanation, the following description will use a generic RSSI path-loss model. In such a generic path loss model, a path loss between two nodes separated by a distance r includes a range independent term, a range dependent term, and a random error term as follows:

$$PL(\text{in } dB) = PL_0(\text{in } dB) + F(r)(\text{in } dB) + \epsilon. \tag{1}$$

PL is the path-loss between two nodes and is calculated by dividing the transmitted power by the received power and converting the result to dB. To convert to dB, one takes a 10-based logarithm of the result and multiplies the result by 10. $PL_0$ is the path-loss at some constant distance $r_0$ ($r_0 = 1$ m here for convenience) and is a constant to be estimated. $\epsilon$ is the random error representing mainly the error due to the propagation environment or shadowing effect. We are interested in estimating the deterministic portion of the path-loss model in (1), i.e., the range independent term $PL_0$ and range dependent term $F(r)$.

Equation (1) can be interpreted in different ways. One way is to stand at a node 201 and look out from the node (see FIG. 2). As the node is connected to nodes at different distances, equation (1) describes the path loss model for node 201 as the distance between node 201 and other nodes varies. Since each node within a communication system may see a different environment, equation (1) describes a node-specific path-loss model. Once all the parameters in (1) are established for a node, the node can estimate the range r from a node on its neighbor list according the measured power and equation (1).

If the RSSI (transmit and receive power) information is available in addition to the neighbor list, each node can generate its own path-loss model based on this information without carrying out a measurement campaign consisting of many range (r) measurements.

The basic concept relates the radius r from a node to N, the number of neighbors of the said node within the radius r. For example, in a 2D area and assuming no shadowing effect, the area within the radius r of a node is $\pi r^2$. If the density of nodes is $\rho$, the number of nodes within the radius r is:

$$N = \rho \pi r^2, \tag{2a}$$

or, $$r = (N/\pi\rho)^{1/2}. \tag{2b}$$

An example is shown in the FIG. 2. Node 201 has about 8 neighbors (N=8) within the range of $r_1$ and about 34 neighbors with the range of $r_2$. According to equation (2b), $r_2$ is about twice as large of $r_1$.

Once the relationship between N and r, i.e., r(N), is established, equation (1) can be re-written as $$PL(\text{in } dB) = PL_0(\text{in } dB) + F(r(N))(\text{in } dB) + \epsilon. \tag{1a}$$

N can be obtained directly from the neighbor list with the RSSI information. To do this, each node ranks its neighbors according to the path-loss information and then a 1-to-1 correspondence between the path-loss PL and the number of neighbors N with their path-loss no greater than PL can be established.

As is evident, to establish the relationship (1) between PL and r, a lot of manual measurements of distance r are required, while to establish the relationship between PL and N in (1a), no extra measurements are needed other than the available neighbor list and RSSI information. To show how this works, let's assume the following commonly used F(r), $$F(r) = 10n \log(r). \tag{3}$$

Where n is the path loss index.

Equation (1) becomes $$PL(\text{in } dB) = PL_0(\text{in } dB) + 10n \log(r) + \epsilon. \tag{1b}$$

From equations (2b) and (3), we have $$F(r) = 5n \log(N) - 5n \log(\pi\rho) + \epsilon_1. \tag{4}$$

Combining (1) and (4), we have $$PL(dB) = PL_0(dB) + 5n \log(N) - 5n \log(\pi\rho) + \epsilon + \epsilon_1. \tag{5}$$

$\epsilon_1$ is the error due to the replacement of r in F(r) by r(N), including the boundary effect and quantization error (N taking integer numbers only). These errors will show up in the actual implementations and their effect will be discussed later. If we have the neighbor list for a node and the RSSI information, we can arrange the neighbor list of node according to the path-loss or RSSI, say from small path loss to large path loss (closest to farthest). Equation (5) relates a given path-loss PL and the corresponding N, number of nodes whose path loss to the said node is no greater than the path loss PL on the left-hand side of equation (5). Equation (5) can be re-written as $$y = b_0 + b_1 x + \epsilon, \tag{6}$$

$$y = PL(dB), x = \log(N), b_0 = PL_0 - 5n \log(\pi\rho), b_1 = 5n. \tag{6a}$$

One can estimate both parameters $b_0$ and $b_1$ as follows, $$\hat{b}_1 = \frac{N_{max} \sum_{i=1}^{N_{max}} x_i y_i - \left(\sum_{i=1}^{N_{max}} x_i\right)\left(\sum_{i=1}^{N_{max}} y_i\right)}{N_{max} \sum_{i=1}^{N_{max}} x_i^2 - \left(\sum_{i=1}^{N_{max}} x_i\right)^2} \tag{7a}$$

$$\hat{b}_0 = \frac{N_{\max} \sum_{i=1}^{N_{\max}} y_i - \hat{b}_1 \sum_{i=1}^{N_{\max}} x_i}{N_{\max}} \quad (7b)$$

The summation is over all statistical samples to be used for the parameter estimation. $N_{max}$ is the total number of samples used. For example, with reference to FIG. 2, $N_{max}=2$, since there are only two samples used, one at $r_1$ and the other at $r_2$. If $y_1=60$ dB and $y_2=70$ dB, then we have:

$N_{max}=2$;

Sample 1 at $r_1$: $N_1=8$, $y_1=60$ dB, $x_1=\log(N_1)$

Sample 2 at $r_2$: $N_2=34$, $y_2=70$ dB, $x_2=\log(N_2)$.

From (6) and (6a), we can obtain the estimation of n and $PL_0$ as follows $$n=b_1/5, \quad (8a)$$

$$PL_0=b_0+b_1 \log(\pi\rho). \quad (8b)$$

If we know the node density $\rho$, we can obtain both $PL_0$ and n. If, instead of a 2D area, we have a 1D or a 3D space, (7a) and (7b) still hold but (8a) has to be modified to $$n=m\,b_1/10, \quad (9)$$

m=1, 2, 3 for 1D, 2D, and 3D, respectively. The relationship between N and r for 1D is, $$N=\rho\pi r, \text{ or, } r=N/\rho\pi. \quad (10)$$

And for 3D, $$N=(4/3)\rho\pi r^3, \text{ or, } r=(3N/4\rho\pi)^{1/3}. \quad (11)$$

The node density functions $\rho$ in (10), (2a), and (11) should use the proper units for 1D (nodes/m), 2D (nodes/$M^2$), and 3D (nodes/$M^3$), respectively.

For other forms of F(r), similar equations as (5-9) can be obtained to estimate all the parameters in equation (1). If the node density is known, we can obtain the range independent term $PL_0$ in equation (1).

Due to the shadowing effect, the quality of the data will deteriorate for nodes close to the boundary of the system coverage area. For example, if a node has a range of 10 m and is 15 m away from the boundary, the path loss index n in equation (1a) is 2, and the shadowing effect has a standard deviation of 6 dB, the node will be able to communicate with nodes beyond 15 m and thus the estimated path loss index will depend on nodes beyond 15 m. Since the said node is 15 m away from the boundary, the relationship between N and r (from (10), (2a), and (11) for 1D, 2D, and 3D, respectively) will not hold, as there will be no more nodes beyond the boundary. It is then preferred to use the data depending only on nodes within the boundary, which may count for only certain percentage of data points with path loss smaller than a certain quantity. This percentage number may range from a few percent to 100% and will depend on the index n, shadowing effect of the environment, and the closeness of the node to the system boundary. The smaller n, stronger shadowing, and closer to the boundary require lower percentage of nodes to be counted or need to include the nodes with smaller path loss.

In replacing r in (1b) with N as in (5), we have introduced a quantization error included in $\epsilon_1$. This error comes essentially due to the fact that we represent a continuous distance variable r by a discrete number N as in equations (10), (2b), and (11) for 1D, 2D, and 3D, respectively. This error can be reduced by using N-1 rather than N in (2b), (10), and (11), where N is the number of neighbors within the radius r.

The shadowing may also have an effect of increasing the density of nodes, i.e., a node may have more neighbors when the shadowing is strong than when the shadowing is weak.

Implementation

FIG. 3 is a block diagram of a node 301 equipped to determine its location via path loss measurements. In a preferred embodiment of the present invention node 301 comprises antenna 303 coupled to transmitter/receiver (transceiver) 304, in turn, coupled to logic circuitry 305. Although various forms for antenna 303, transceiver 304, and logic circuitry 305 are envisioned, in a preferred embodiment of the present invention node 301 is formed from a Freescale Inc. MC13192 transceiver 304 coupled to a Motorola HC08 8-bit processor 305. When node 301 wishes to determine its location, it receives over-the-air communication signal 306 transmitted from all nodes 104 and 105. Communication signal 306, received from known-located nodes 105 comprises a physical location of reference node 105 (e.g., (x,y,z) components) for each node 105, while communication signal 306 received from nodes 104 comprises a known sequence. Once signal 306 is received by transceiver 304, RSSI values are obtained by logic circuitry 305. Logic circuitry 305 then estimates a path loss model, and then determines a distance to known-located nodes utilizing the path loss model. As discussed, the path loss model that relates path loss to distance is obtained by determining the number of neighbors corresponding to given path loss values and relating these numbers of neighbors to the corresponding path loss values.

Once the distances to known-located nodes are known, logic circuitry 305 locates itself. It should be noted that if centralized LFE 106 is being utilized to determine locations, logic circuitry 305 would then estimate a path loss model, determine distances to know-located nodes, and report the distances to LFE 106, where a location estimate will be made.

Figure 4:
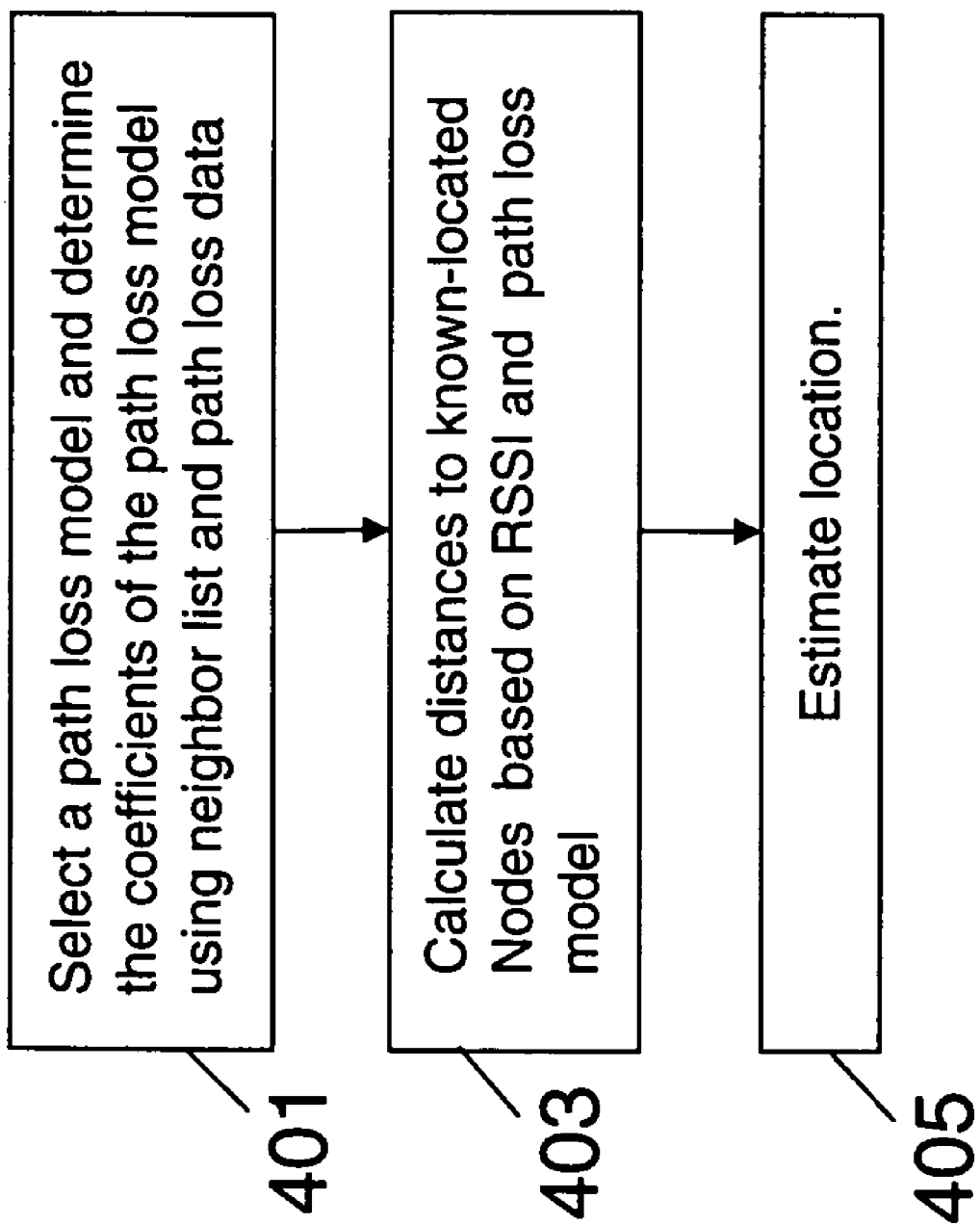
FIG. 4 is a flow chart showing operation of the node of FIG. 3.

FIG. 4 is a flow chart showing operation of the node of FIG. 3 during location estimation. The logic flow begins at step 401 where logic circuitry 305 accesses an internally stored neighbor list to determine a plurality of neighboring nodes and determine a path loss model (e.g., a relationship between path loss and distance) based on the neighbor list and node density. For example, using the path loss model of equation 1a (although any path loss model may be used), logic circuitry 305 will receive signals transmitted from the plurality of neighboring nodes and analyze the signals to:

determine $N_{max}$, which is the maximum number of neighboring nodes to be used;
determine a plurality of path loss values to the plurality of neighboring nodes used $\{y_1, y_2, \ldots, y_{Nmax}\}$;
select a path loss value ($y_i$) from above list;
determine a number of neighbors ($N_i$) having less path loss than a particular neighboring node $y_i$;
determine $x_i=\log(N_i)$; and
continue until all $y_i$ are selected.

Once the above steps are taken, then logic circuitry can determine $\hat{b}_1$ and $\hat{b}_0$. Logic circuitry then determines a value for n from $\hat{b}_1$, and $PL_0$ from $\hat{b}_0$. Once n and $PL_0$ are obtained, a distance to each neighboring node can be estimated from equation 1b and a relationship between path loss and distance (i.e., the path loss model) is obtained. As is evident, the distance to each neighboring node is not obtained physically, but is estimated based on a node density (e.g., nodes per square meter, or nodes per cubic meter) and a number of nodes having a path loss less than a particular value.

Continuing, once a path loss model has been obtained, the logic flow continues to step 403 where distances to known located nodes are obtained based on the path loss model. In particular, logic circuitry 305 obtains a path loss for each known-located node, and this path loss is translated to a distance based on the path loss model. Once these distances have been obtained, the logic flow continues to step 405 where the distances can either be provided to centralized equipment for location (via transceiver 304), or logic circuitry 305 can locate the node.

While the invention has been particularly shown and described with reference to a particular embodiment, it will be understood by those skilled in the art that various changes in form and details may be made therein without departing from the spirit and scope of the invention. For example, the above discussion was provided utilizing a particular path loss model shown in equation 1a. It should be evident to those of ordinary skill in the art that any path loss model may be utilized. Regardless of the path loss model used, node density, path loss values and corresponding numbers of neighbors of a node will be used to determine a distance of the said node to each of its neighbors. It is intended that such changes come within the scope of the following claims.

The invention claimed is:

1. A method for locating a node within a wireless communication system, the method comprising the steps of:
   determining a plurality of path loss values to a plurality of nodes;
   determining a path loss model that is a function of node density and the path loss to the plurality of nodes, wherein the node density comprises a value of nodes per unit area or volume;
   determining distances to known located nodes based on the path loss model; and
   locating the node based on distances to known located nodes.

2. The method of claim 1 wherein the step of determining the path loss model comprises the step of determining a relationship between path loss and distance.

3. The method of claim 1 wherein the step of determining the path loss model based on the node density comprises the step of determining the path loss model based on a number of nodes per square meter.

4. The method of claim 1 wherein the step of determining the path loss model based on the node density comprises the step of determining the path loss model based on a number of nodes per cubic meter.

5. The method of claim 1 wherein the step of determining the path loss comprises the step of determining a difference between a power a signal was received at and a power the signal was transmitted at.

6. The method of claim 1 wherein the step of determining the plurality of neighboring nodes comprises the step of determining the plurality of neighboring nodes form a neighbor list.

7. The method of claim 1 wherein the path loss model is not based on distance to other nodes.

8. A method comprising the steps of:
   determining a plurality of neighboring nodes;
   determining number of neighboring nodes having a path loss less than a particular neighboring node;
   determining a path loss model based on a node density and the number of nodes having the path loss less than the particular node, wherein the node density comprises a value of nodes per unit area or volume;
   determining distances to known-located nodes based on the path loss model; and
   determining a location based on the distances to known-located nodes.

9. The method of claim 8 wherein the step of determining the path loss model comprises the step of determining a relationship between path loss and distance.

10. The method of claim 8 wherein the step of determining the path loss model based on the node density comprises the step of determining the path loss model based on a number of nodes per square meter.

11. The method of claim 8 wherein the step of determining the path loss model based on the node density comprises the step of determining the path loss model based on a number of nodes per cubic meter.

12. An apparatus comprising:
   a receiver receiving signals from a plurality of nodes; and
   logic circuitry analyzing the signals from the plurality of nodes to determine a number of nodes having a path loss less than a particular node, determine a path loss model based on a node density and a number of nodes having the path loss less than the particular node, determine distances to known-located nodes based on the path loss model, and determine a location based on the distances to known-located nodes, wherein the node density comprises a value of nodes per unit area or volume.

13. The apparatus of claim 12 wherein the path loss model comprises a relationship between path loss and distance.

14. The apparatus of claim 12 the node density comprises a number of nodes per square meter.

15. The apparatus of claim 12 wherein the node density comprises a number of nodes per cubic meter.

16. The apparatus of claim 12 wherein the path loss comprises a difference between a power a signal was received at and a power the signal was transmitted at.

* * * * *

UNITED STATES PATENT AND TRADEMARK OFFICE
CERTIFICATE OF CORRECTION

PATENT NO. : 7,436,781 B2 Page 1 of 1
APPLICATION NO. : 11/143253
DATED : October 14, 2008
INVENTOR(S) : Feng Niu et al.

It is certified that error appears in the above-identified patent and that said Letters Patent is hereby corrected as shown below:

IN THE SPECIFICATION

In Column 5, in Equation (7b), delete "$\hat{b}_0 = \dfrac{N_{max} \sum_{i=1}^{N_{max}} y_i - \hat{b}_1 \sum_{i=1}^{N_{max}} x_i}{N_{max}}$" and insert -- $\hat{b}_0 = \dfrac{\sum_{i=1}^{N_{max}} y_i - \hat{b}_1 \sum_{i=1}^{N_{max}} x_i}{N_{max}}$ --, therefor.

In Column 5, Line 41, delete "(nodes/M$^2$)," and insert -- (nodes/m$^2$), --, therefor.

In Column 5, Line 42, delete "(nodes/M$^3$)," and insert -- (nodes/m$^3$), --, therefor.

Signed and Sealed this

Fourth Day of August, 2009

JOHN DOLL
*Acting Director of the United States Patent and Trademark Office*